US007017742B2

(12) United States Patent
Dragoo et al.

(10) Patent No.: US 7,017,742 B2
(45) Date of Patent: Mar. 28, 2006

(54) RECYCLABLE CONTAINER ADAPTED FOR MOVEMENT BY A LIFTING DEVICE AND METHOD FOR MAKING SAME

(75) Inventors: Robert K. Dragoo, St. Paris, OH (US); David E. Shepherd, Sidney, OH (US); Michael A. Rowland, St. Paris, OH (US)

(73) Assignee: Hobart Brothers Company,, Troy, OH (US)

( * ) Notice: Subject to any disclaimer, the term of this patent is extended or adjusted under 35 U.S.C. 154(b) by 103 days.

(21) Appl. No.: 10/119,463

(22) Filed: Apr. 10, 2002

(65) Prior Publication Data

US 2003/0192800 A1 Oct. 16, 2003

(51) Int. Cl.
*B65D 85/66* (2006.01)
*B65D 85/04* (2006.01)

(52) U.S. Cl. ...................... 206/408; 206/410; 206/397; 206/409; 206/386

(58) Field of Classification Search ................ 206/397, 206/408, 409, 389, 396, 386, 595–599; 242/170–172, 242/578, 578.1, 588.3, 588.4; 108/51.3, 108/56.1, 57.31, 57.33
See application file for complete search history.

(56) References Cited

U.S. PATENT DOCUMENTS 4,976,353 A * 12/1990 Halliday ..................... 206/386
5,163,556 A * 11/1992 Akao et al. ................. 206/394
5,494,160 A * 2/1996 Gelmetti ..................... 206/395
5,746,380 A * 5/1998 Chung ........................ 242/171
5,758,834 A 6/1998 Dragoo et al. ............. 242/128
6,016,911 A * 1/2000 Chen .......................... 206/395
6,070,726 A * 6/2000 Graham ...................... 206/386
6,079,560 A * 6/2000 Champion .................. 206/386
6,237,768 B1 * 5/2001 Cipriani ...................... 206/408
2001/0006184 A1 7/2001 Ohike et al. .................. 228/33
2003/0019776 A1 1/2003 Matsuguchi et al. ........ 206/443

FOREIGN PATENT DOCUMENTS

EP 0 334 329 A2 3/1989
EP 1 057 751 A1 12/2000
GB 1 216 909 3/1969

* cited by examiner

*Primary Examiner*—Jila M. Mohandesi
(74) *Attorney, Agent, or Firm*—Fletcher Yoder

(57) ABSTRACT

A container for storing material, such as welding wire. The container is adapted to be lifted by inserting a fork, or other lifting member, of a lifting device into the container. The container may comprise a fiber drum having one or more openings, or recesses, adapted to receive a fork of a lifting device. The container may be cylindrical. The container may be comprised of a cellulosic material. The container may house welding wire. A method of manufacturing a container adapted to be lifted by inserting a member of a lifting device into the container also is featured.

11 Claims, 3 Drawing Sheets

RECYCLABLE CONTAINER ADAPTED FOR MOVEMENT BY A LIFTING DEVICE AND METHOD FOR MAKING SAME

BACKGROUND OF THE INVENTION

The present invention relates generally to the field of containers, and more particularly to a recyclable container that is adapted for movement by a forklift, and that may be used to store welding wire and other materials.

Recyclable containers, such as fiber drums are used to store a variety of products and materials. For example, fiber drums may be used to store wire for use in an arc welding system. In some arc welding systems, such as MIG (Metal Inert Gas) welding systems, metal wire is used as an electrode to produce an arc. The welding wire also acts as filler material and is consumed during the welding process. Typically, the welding wire is fed from a wire feeder to a hand-held welding gun. A welding wire supplier may provide the welding wire to a customer in a fiber drum. A typical fiber drum used for storing welding wire is hollow and formed of a cellulosic material, such as paper or cardboard. In addition, a typical fiber drum has a metal band around the top to enable the fiber drum to be lifted by a device coupled to the metal band. In addition, special straps may be needed to move the fiber drum onto a pallet or to remove the fiber drum from the pallet. The weight of the fiber drums may make movement of the fiber drums difficult. Thus, the fiber drum is placed on a pallet when being moved. A forklift, or other lifting device may then move the pallet.

Fiber drums typically are discarded after the wire, or other material housed therein, is consumed because the fiber drums cannot easily be recycled. Recycling is difficult because the cellulosic portion of the drum must be separated from the metal portion of the drum to recycle either the fibrous portion or the metal portion. That operation can be complex and time consuming. Thus, a typical fiber drum owner ultimately pays to dispose of the empty fiber drum as refuse, rather than regaining some of the cost of the fiber drum by recycling.

Therefore, a need exists for a fiber drum that may be used to transport heavy materials, such as welding wire, and that is easier to move than conventional fiber drums. In addition, a need exists for a fiber drum that is recyclable, or that can be made recyclable with minimal time and effort.

SUMMARY OF THE INVENTION

The present invention provides a technique designed to respond to some or all of these needs. According to one aspect of the present technique, an apparatus for storing materials, such as welding wire, is featured. The container may be adapted to be lifted by inserting a portion of a lifting device into a hole or recess in the container. The container may comprise a fiber drum having one or more openings adapted to receive a fork of a lifting device. The container may be cylindrical and have a false bottom to support the welding wire. The container may be comprised of a cellulosic material. The container may house welding wire.

According to another aspect of the present technique, a method of manufacturing a container adapted to be lifted by inserting a member of a lifting device into the container is featured. The method may comprise adapting a cylindrical fiber drum with an opening operable to receive at least one member of a lifting device. The method also may comprise disposing a false bottom into the container to support the contents, such as welding wire, above the opening in the fiber drum.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
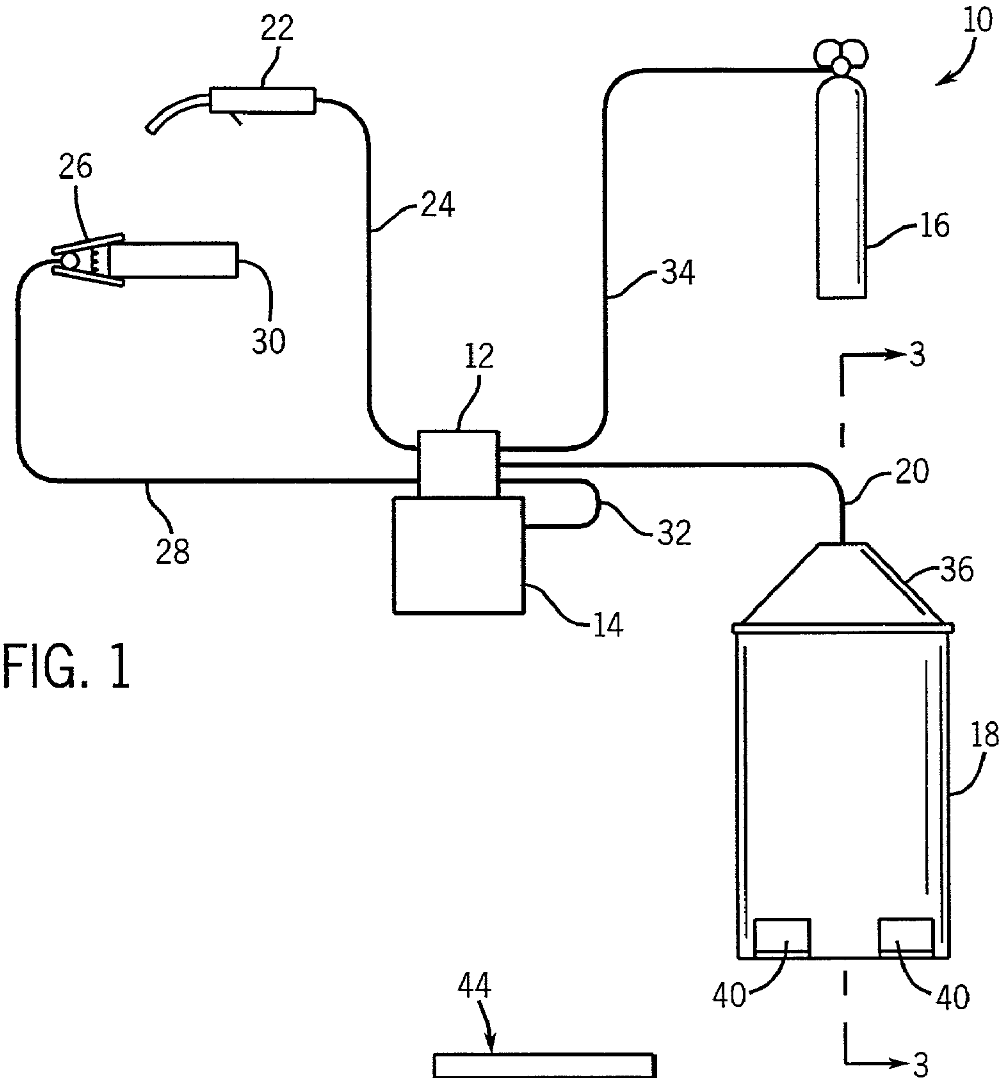
FIG. 1 is a diagrammatical view of a wire welding system, according to an exemplary embodiment of the present technique.

Referring generally to FIG. 1, a wire-welding system 10, such as a MIG welding system, is featured. In the illustrated embodiment, wire-welding system 10 comprises a wire feeder 12, a power source 14, a gas cylinder 16 and a recyclable container 18 containing welding wire 20. Preferably, the recyclable container 18 is comprised of a fibrous material, such as cellulosic paper, paperboard, or cardboard.

The power source 14 provides electricity to the wire feeder 12; the gas cylinder 16 provides inert gas to the wire feeder 12; and the container 18 provides welding wire 20 to the wire feeder 12. In the illustrated embodiment, the wire feeder 12 provides electricity, welding wire 20, and inert gas to a welding torch 22. The wire, gas, and electricity are coupled to the torch 22 by a welding cable 24. In addition, a work clamp 26 is coupled to the wire feeder 12 by a ground cable 28. The work clamp 26 is secured to a workpiece 30 to electrically couple the workpiece 30 to the wire feeder 12. The torch 22 controls the operation of the system 10. When the torch 22 is activated, welding wire 20 is fed through the torch 22 by the wire feeder 12. When the welding wire 20 contacts the workpiece 30, an electrical circuit between the workpiece 30 and the wirefeeder 12 is completed and an electric arc is produced. The electric arc melts the workpiece

30 and welding wire 20 at the point of contact. The inert gas shields the molten area from contaminants. A power cable 32 conducts electricity from the power source 14 to the wire feeder 12. A hose 34 channels gas from the gas cylinder 16 to the wire feeder 12. A conical adapter 36 feeds the welding wire from the container 18 to the wire feeder 12.

In the illustrated embodiment, the container 18 is a hollow, generally cylindrical fiber drum and the adapter 36 has a conforming circular bottom adapted to fit atop the fiber drum cylinder. However, the container 18 may have a shape other than a cylindrical shape. For example, the container 18 may be square, hexagonal, octagonal, etc. A spool of welding wire is disposed within the hollow interior of the fiber drum 18. The welding wire 20 is unwound from the spool and fed from the fiber drum 18 through a hole (not shown) in the adapter 36. Additional means may be used to direct the welding wire 20 to the wire feeder 12.

Figure 2:
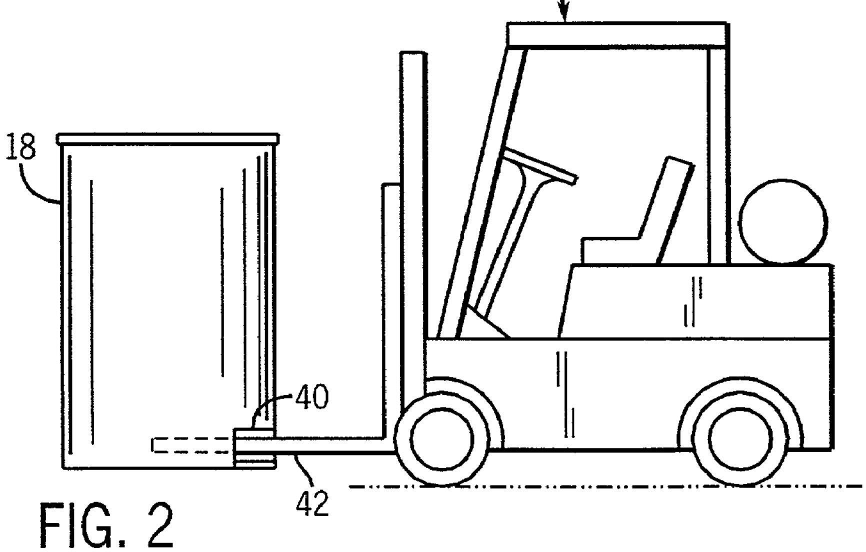
FIG. 2 is an elevational view illustrating the lifting of a fiber drum by a forklift, according to an exemplary embodiment of the present technique.

In the illustrated embodiment, the fiber drum 18 has at least one, and as illustrated, a plurality of holes, or recesses, 40 located on a bottom portion of the fiber drum 18. As best illustrated in FIG. 2, the fiber drum 18 is adapted to enable the forks 42 of a forklift 44, or other member of a lifting device, to enter one or more of the plurality of holes, or recesses, 40 and be positioned below the welding wire 20 to lift the fiber drum 18. In the illustrated embodiment, two holes 40 are used, one for each fork 42 of the forklift 44. However, the fiber drum 18 also may be adapted with a single hole, or recess, that enables two forks 42, or a single lifting member to enter the fiber drum 18. In addition, exit holes may be provided to enable the forks 42 to extend through the fiber drum 18. Furthermore, a lifting device other than a forklift 44 may be used to lift the fiber drum 18 via one or more of the holes 40, or other (i.e. open) recesses. For example, lifting straps could be passed through the openings to enable an overhead crane to lift the container 18. Other lifting devices may also be used.

Figure 3:
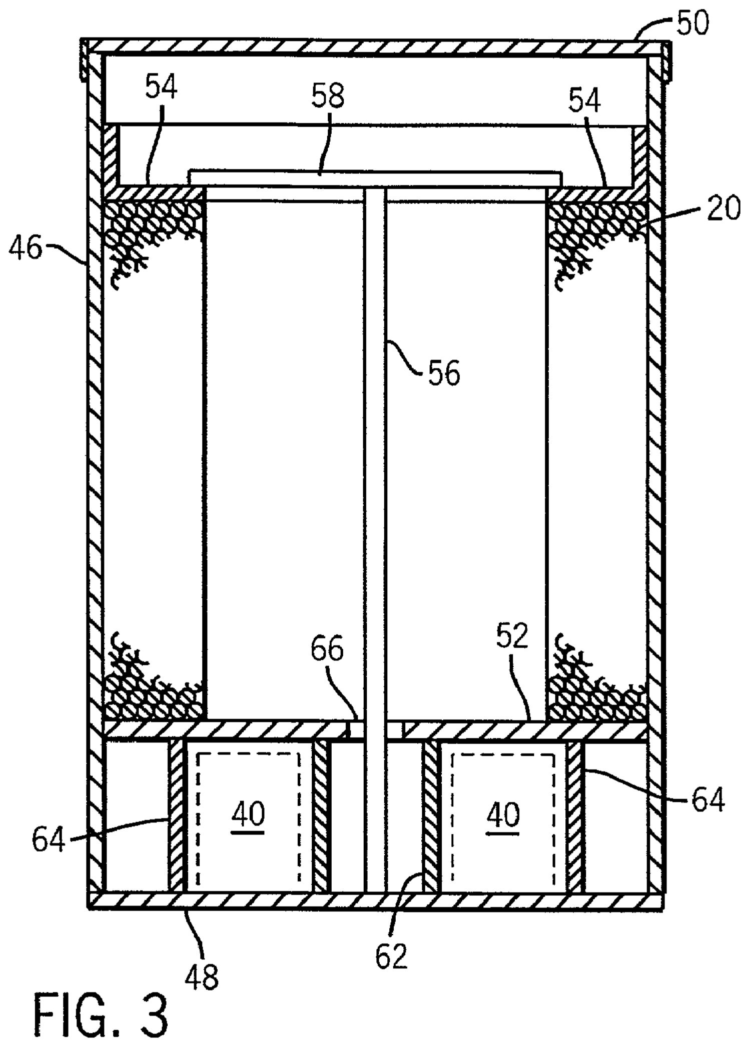
FIG. 3 is a cross-sectional view of the fiber drum of FIG. 1, taken generally along line 3—3 of FIG. 1.

Referring generally to FIG. 3, an exemplary embodiment of a fiber drum 18 is illustrated. In the illustrated embodiment, the fiber drum 18 has a cylindrical portion 46, a bottom 48, a lid 50, and a false bottom 52. The false bottom 52 is placed within the cylindrical portion 46 and the welding wire 20 is then placed atop the false bottom 52. A removable metal ring 54 is placed above the welding wire 20 to secure the welding wire 20 during shipping. In this embodiment, an elastic strap 56 and metal rod 58 are used to drive the metal ring 54 downward to secure the welding wire 20 within the cylindrical housing 46 during transport. The ring 54 and rod 58 may be removed from the fiber drum 18 when the drum is placed in service. The elastic strap 56 also may be removed at this time. In the illustrated embodiment, the cylindrical portion 46, bottom 48, lid 50, and false bottom 52 are composed of a fibrous material, such as cellulosic paper, paperboard, or cardboard. However, the lid 50 may have a metal band to secure the lid 50 to the cylindrical portion 46 during transport. In this embodiment, the cylindrical housing 46, bottom 48, and false bottom 52 are adapted to be free of metal so that they may be more readily recycled once the welding wire has been consumed. The metal ring 54 and metal rod 58 may be recycled as metal once they are removed from the fiber drum 18.

Figure 4:
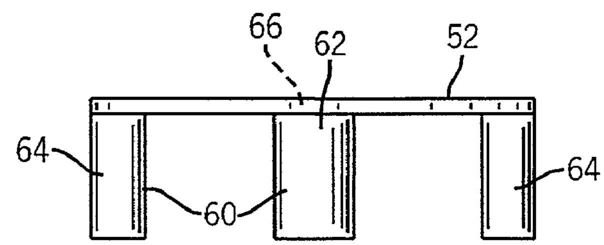
FIG. 4 is an elevational view of a false bottom for a fiber drum, according to an exemplary embodiment of the present technique.
Figure 5:
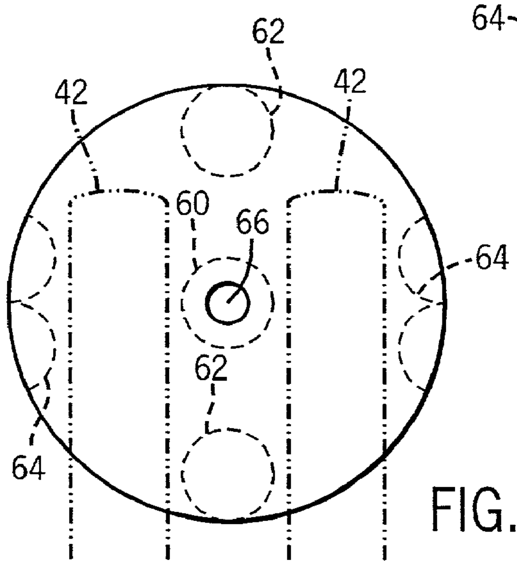
FIG. 5 is a top view of the false bottom of FIG. 4, according to an exemplary embodiment of the present technique.

Referring generally to FIGS. 4 and 5, a plurality of supports 60 are secured to the false bottom 52. The plurality of supports 60 and false bottom 52 are adapted to support the welding wire 20 above the bottom to provide clearance for the forks 42 of the forklift 44 to enter the fiber drum 18 below the wire 20. In the illustrated embodiment, the supports 60 also are adapted from cellulosic cylinders, such as cardboard tubing. However, the supports 60 may be comprised of another suitable material. In this embodiment, there are circular supports 62 and semi-circular supports 64. The semicircular supports 64 may be adapted from the circular supports 62, for example, by cutting them in half lengthwise. Preferably, the supports 60 are secured, such as by glue, to the bottom 48 and the false bottom 52. The false bottom 52 also may be secured to the cylindrical portion 46 of the fiber drum 18. Furthermore, rather than using a false bottom 52 and the plurality of holes 40, the fiber drum 18 may be adapted with the supports 60 secured to the bottom 48 of the fiber drum 18 from below, rather than from above, to create a space for the forks 42, or another lifting member, to be positioned below the bottom 48 of the fiber drum 18.

In the illustrated embodiment, the false bottom 52 has a hole 66 to enable the elastic strap 56 to pass through the false bottom 52. Furthermore, the cylindrical housing 46, bottom 48, false bottom 52, and supports 60 are adapted to be free of metal so that they may be more readily recycled as a fibrous material once the welding wire has been consumed. The metal ring 54 and metal rod 58 may be recycled as metal once they are removed from the fiber drum 18.

Figure 6:
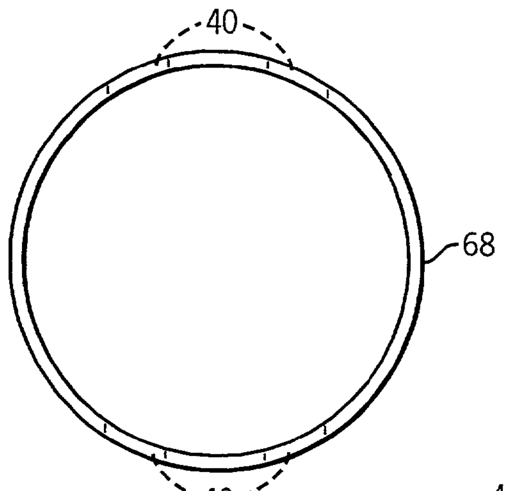
FIG. 6 is a top view of an alternative embodiment of a fiber drum, according to an exemplary embodiment of the present technique.

Referring generally to FIG. 6, an alternative embodiment of a fiber drum 68 is illustrated. In the embodiment illustrated, a second plurality of holes 40 are provided opposite the first plurality of holes 40 to enable the forks to extend through the fiber drum 18 and to enable the forks to enter the fiber drum from a second orientation.

Figure 7:
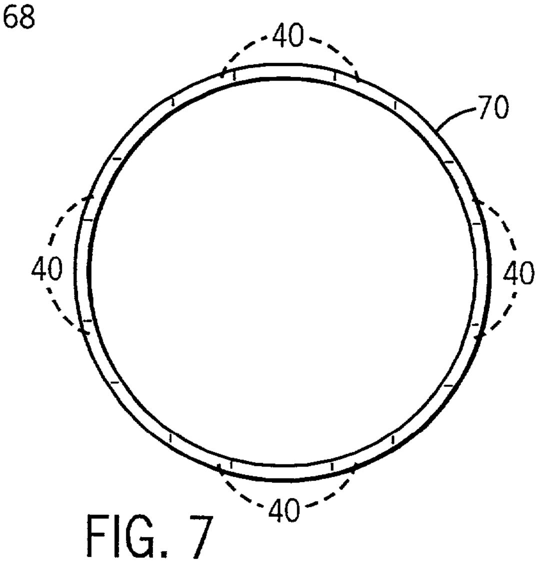
FIG. 7 is a top view of a second alternative embodiment of a fiber drum, according to an exemplary embodiment of the present technique.

Referring generally to FIG. 7, a second alternative embodiment of a fiber drum 70 is illustrated. In the illustrated embodiment, there are four pairs of holes disposed in fiber drum 70, one pair in each quadrant. The plurality of holes 40 enable the forks 42 to enter the fiber drum 70 from four directions.

Figure 8:
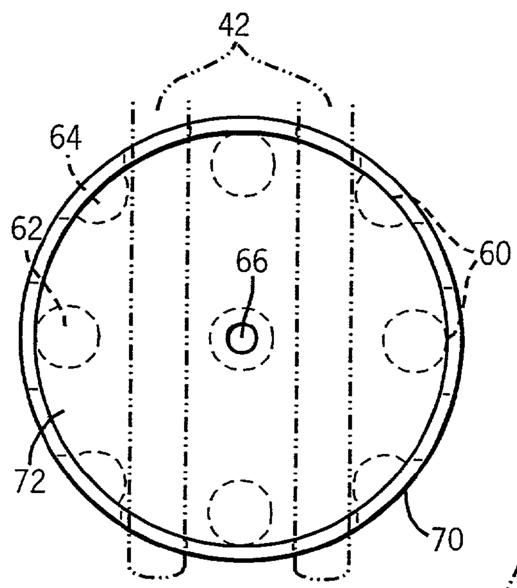
FIG. 8 is a top view of the fiber drum of FIG. 7 and an alternative embodiment of a false bottom, illustrating the insertion of forks into the fiber drum from a first direction, according to an exemplary embodiment of the present technique.
Figure 9:
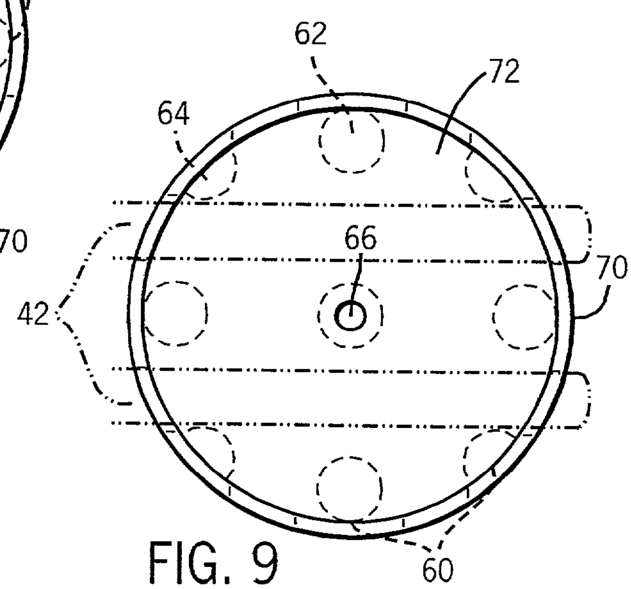
FIG. 9 is a top view of the fiber drum of FIG. 7 and an alternative embodiment of a false bottom, illustrating the insertion of forks into the fiber drum from a second direction, according to an exemplary embodiment of the present technique.

Referring generally to FIGS. 8 and 9, an alternative embodiment of a false bottom 72 disposed within the fiber drum 70 is featured. The false bottom 72 is adapted to be aligned with the plurality of holes 40 to provide clearance for the forks 42 to enter the fiber drum 70 from each of four directions around the fiber drum 70.

The illustrated embodiments of fiber drums described above enable the metal portions of the fiber drums to be easily separated from the non-metal portions of the fiber drums, thus enabling the fiber drums to be recycled easily. In addition, the fiber drums described above are easily moved by standard lifting devices, such as forklifts, without the need of special lifting straps or pallets.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, the holes in the cylindrical portion and the supports may be arranged in a myriad of orientations to enable the fiber drum to be lifted from a number of different orientations. In addition, the holes in the cylindrical portion of the container may be adapted to receive a lifting member other than the forks of a forklift.

What is claimed is:

1. A welding wire and container assembly, comprising:

a housing consisting essentially of a recyclable material, the housing comprising:

a planar base;

a wall having an upper edge and a lower edge engaging the base, wherein the base and the wall define exterior peripheral surfaces of the housing;

a planar false bottom disposed within the wall between the upper edge of the wall and the base, wherein the false bottom is circumscribed by the wall; and a plurality of support structures, each support structure being in abutment with the base and the false bottom to support the false bottom;

wherein the support structures are spaced from one another between the base and the false bottom such that the false bottom, the base, and external peripheral surfaces of the support structures define passageways configured to receive forks of a forklift, wherein the wall includes at least one aperture for access to the passageways to receive the forks, and wherein the base, the wall, the false bottom, and the support structures comprise similar recyclable materials; and a coil of welding wire disposed in the housing and on the false bottom.

2. The container of claim 1, wherein the support structures comprise hollow members.

3. The container of claim 1, comprising a retention mechanism configured to bias the coil of welding wire toward the false bottom, the retention mechanism comprising a tension member coupled to the base, extending through the false bottom, and configured to bias an biasing member to bias the coil of welding wire toward the false bottom.

4. The container of claim 1, comprising a top having an upper portion and skirt extending perpendicularly from the upper portion, wherein the skirt is configured to produce a friction fit with the wall.

5. The container as recited in claim 1, wherein the wall, the base, the false bottom, and the support structure consist essential of a paperboard material.

6. The container as recited in claim 1, wherein the wall, the base, and the false bottom include arcuate edges.

7. A welding wire and container assembly, comprising:

A welding wire and container assembly, comprising:

a right-cylindrical housing consisting essentially of a recyclable cardboard material, the housing comprising:

a circular, planar base;

a right-cylindrical wall having an upper edge and a lower edge engaging the base, wherein the base and the wall define exterior peripheral surfaces of the housing;

a planar false bottom disposed within the wall between the upper edge of the wall and the base, wherein the false bottom is circumscribed by the wall; and a plurality of support structures, each support structure being in abutment with the base and the false bottom to support the false bottom;

wherein the support structures are spaced from one another between the base and the false bottom such that the false bottom, the base, and external peripheral surfaces of the support structures define passageways configured to receive forks of a forklift and wherein the wall includes at least one aperture for access to the passageways to receive the forks; and a coil of welding wire disposed in the housing and on the false bottom.

8. The container as recited in claim 7, wherein each support structure comprises a hollow member, a longitudinal axis of the hollow member being generally orthogonal to the false bottom and the base.

9. The container as recited in claim 7, wherein each support structure comprises a hollow cylinder.

10. The container as recited in claim 7, comprising a retention mechanism configured to bias the coil of welding wire toward the false bottom, the retention mechanism comprising a tension member coupled to the base, extending through the false bottom, and configured to bias a biasing member in toward the false bottom to provide a retaining force to the coil of welding wire.

11. A welding wire and container assembly, comprising:

a right-cylindrical housing consisting essentially of a recyclable cardboard material, the housing comprising:

a circular, planar base;

a right-cylindrical wall having an upper edge and a lower edge engaging the base, wherein the base and the wall define exterior peripheral surfaces of the housing;

a planar false bottom disposed within the wall between the upper edge of the wall and the base, wherein the false bottom is circumscribed by the wall; and a plurality of support structures, each support structure being in abutment with the base and the false bottom to support the false bottom;

wherein the support structures are spaced from one another between the base and the false bottom such that the false bottom, the base, and external peripheral surfaces of the support structures define passageways configured to receive forks of a forklift, wherein the wall includes at least one aperture for access to the passageways to receive the forks, and wherein the base, the wall, the false bottom, and the support structures comprise similar recyclable materials;

a coil of welding wire disposed in the housing and on the false bottom; and a retention mechanism configured to bias the coil of welding wire toward the false bottom, the retention mechanism comprising a tension member coupled to the base, extending through the false bottom, and configured to bias a biasing member toward the false bottom to provide a retaining force to the coil of welding wire.

* * * * *